(12) United States Patent
Kern

(10) Patent No.: US 11,390,523 B2
(45) Date of Patent: Jul. 19, 2022

(54) METHOD AND PLANT FOR PRODUCING NITRIC ACID

(71) Applicants: thyssenkrupp Industrial Solutions AG, Essen (DE); thyssenkrupp AG, Essen (DE)

(72) Inventor: Paul Kern, Dortmund (DE)

(73) Assignees: THYSSENKRUPP INDUSTRIAL SOLUTIONS AG, Essen (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/479,518

(22) PCT Filed: Jan. 18, 2018

(86) PCT No.: PCT/EP2018/051213
§ 371 (c)(1),
(2) Date: Jul. 19, 2019

(87) PCT Pub. No.: WO2018/137996
PCT Pub. Date: Aug. 2, 2018

(65) Prior Publication Data
US 2019/0337804 A1    Nov. 7, 2019

(30) Foreign Application Priority Data
Jan. 25, 2017   (DE) .................... 10 2017 201 180.7

(51) Int. Cl.
*C01B 21/26*    (2006.01)
*C01B 21/28*    (2006.01)

(52) U.S. Cl.
CPC .............. *C01B 21/26* (2013.01); *C01B 21/28* (2013.01)

(58) Field of Classification Search
CPC ......... C01B 21/26; C01B 21/28; C01B 21/40; C01B 21/30; C01B 21/32
See application file for complete search history.

(56) References Cited

U.S. PATENT DOCUMENTS 2,115,173 A * 4/1938 Klingelhoefer ......... C01B 21/36
423/402
2,135,733 A   11/1938 Richardson
(Continued)

FOREIGN PATENT DOCUMENTS

AU    459983 B    12/1972
DE    3903570 A    8/1990
(Continued)

OTHER PUBLICATIONS

English Translation of International Search Report issued in PCT/EP2018/051213, dated Mar. 8, 2018.

*Primary Examiner* — Anthony J Zimmer
(74) *Attorney, Agent, or Firm* — thyssenkrupp North America, LLC

(57) ABSTRACT

A process and a plant for producing nitric acid involves oxidizing ammonia in the presence of catalysts to provide nitrogen monoxide-containing process gas in an oxidation reactor. The formed nitrogen monoxide may be supplied with oxygen-containing gas, and nitrogen monoxide is oxidized to provide nitrogen dioxide that is reacted with water in an absorption apparatus to give nitric acid, nitrous acid, and/or solutions of nitrates and/or nitrites. Oxidation of the nitrogen monoxide may be effected in an additional reactor positioned between the oxidation reactor and the absorption apparatus and traversed by the process gas. The oxidation of the nitrogen monoxide may be effected in an additional reactor parallel and connected to the absorption apparatus and traversed by the process gas. The disclosed processes and plants feature a high energy efficiency combined with a simple construction, and existing plants are easily upgradeable.

4 Claims, 6 Drawing Sheets

(56) References Cited

U.S. PATENT DOCUMENTS

| | | | |
|---|---|---|---|
| 2,955,917 A | 10/1960 | Roberts | |
| 3,634,031 A * | 1/1972 | Hellmer | C01B 21/26 423/392 |
| 3,915,898 A * | 10/1975 | Acres | B01J 35/06 502/315 |
| 3,927,182 A | 12/1975 | Powell | |
| 3,977,832 A * | 8/1976 | Schofield | B01J 19/0006 422/109 |
| 4,042,339 A | 8/1977 | Haselden | |
| 5,985,230 A * | 11/1999 | Vlaming | C01B 21/262 423/392 |
| 6,264,910 B1 * | 7/2001 | Maurer | C01B 21/26 423/392 |
| 2010/0158784 A1 * | 6/2010 | Estenfelder | B01J 35/10 423/404 |
| 2011/0165050 A1 * | 7/2011 | Maurer | C01B 21/28 423/239.1 |
| 2011/0200515 A1 | 8/2011 | Roe | |
| 2012/0183467 A1 | 7/2012 | Qi et al. | |
| 2016/0200575 A1 * | 7/2016 | Olbert | B01J 8/025 423/392 |

FOREIGN PATENT DOCUMENTS

| | | | |
|---|---|---|---|
| DE | 102012000419 A | 7/2012 | |
| DE | 102013004341 A | 9/2014 | |
| EP | 0799794 A | 10/1997 | |
| EP | 0834466 A | 4/1998 | |
| JP | 10029809 A | 2/2010 | |
| KR | 101429793 B1 | 4/2010 | |
| KR | 1020150128949 A | 11/2015 | |
| WO | 2009146758 A | 12/2009 | |
| WO | 2011054928 A | 5/2011 | |

\* cited by examiner

METHOD AND PLANT FOR PRODUCING NITRIC ACID

CROSS REFERENCE TO RELATED APPLICATIONS

This application is a U.S. National Stage Entry of International Patent Application Serial Number PCT/EP2018/051213, filed Jan. 18, 2018, which claims priority to German Patent Application No. DE 10 2017 201 180.7, filed Jan. 25, 2017, the entire contents of both of which are incorporated herein by reference.

FIELD

The present disclosure generally relates to plants and processes for producing nitric acid, including plants and processes for producing nitric acid by oxidation of ammonia with oxygen in the presence of catalysts to afford nitrogen monoxide-containing process gas in an oxidation reactor.

BACKGROUND

In the large industrial scale production of nitrogen-containing feedstocks for the chemical industry the catalytic oxidation of ammonia ($NH_3$) to $NO_x$ nitrogen oxides is often a fundamental reaction. The produced nitrogen oxides are employed for example for producing nitric acid ($HNO_3$) as a starting material for nitrate-containing fertilizers for example.

The production of nitric acid is one of the established processes of chemical engineering which after introduction of the Haber-Bosch process for $NH_3$ synthesis was developed to a state of industrial maturity by W. Ostwald on the basis of platinum catalysts and whose concept still forms the basis of modern $HNO_3$ production even today.

To produce nitric acid ammonia $NH_3$ is initially reacted with air to produce nitric oxide NO which is then oxidized to afford nitrogen dioxide $NO_2$.

The thus-obtained nitrogen dioxide $NO_2$ is subsequently absorbed in water to form nitric acid. In order that the greatest possible amount of produced nitrogen dioxide $NO_2$ is absorbed by water, the absorption is generally carried out at elevated pressure, preferably at pressures between about 4 and about 14 bar.

The oxygen required for the reaction of the ammonia raw material is generally supplied in the form of atmospheric oxygen. For the purposes of supplying, the process air is compressed in a compressor and brought to a pressure that is adapted not only to the oxidation reaction but also to the absorption reaction.

The energy for compressing the air is customarily obtained by expansion of the residual gas exiting the absorption to atmospheric pressure in a residual gas expander and recovery of the heats liberated in the reactions. The nitric acid plants constructed in various configurations are in each case adapted to the specific requirements of their respective sites.

Today production of nitric acid is carried out in the one-pressure process or the two-pressure process. In the one-pressure process both the combustion and the absorption are carried out at intermediate pressure (<8 bar) or high-pressure (>8 bar).

In the case of large nominal capacities and/or relatively high acid concentrations a nitric acid plant configured according to the two-pressure process is the more economic solution. In the two-pressure process the combustion of the employed ammonia is carried out at a first pressure, namely at a lower pressure compared to the absorption pressure. The nitrogen monoxide (NO)-containing gases (nitrous gases or nitrous gas) formed during the combustion are generally brought to the second pressure, the absorption pressure, after cooling by nitrous gas compression. The advantage of the two-pressure process is that the pressure stages are adapted to the respective reactions, thus ensuring both an optimal combustion yield and a compact absorption.

The plants for performing the processes discussed hereinabove generally comprise at least one air compressor and at least one expansion turbine for the residual gas (also known as a residual gas turbine).

Such plants are known from WO 2011/054928 A1 for example.

In nitric acid production ammonia is thus combusted in the air in the presence of platinum meshes. The meshes are traversed by a gas mixture composed of typically about 9-12 vol % of $NH_3$ and air, a temperature of about 800-950° C. being established at the meshes as a result of the exothermicity of the oxidation reaction. $NH_3$ is oxidized to very selectively afford nitrogen monoxide (NO) (A, reaction scheme I) which is then oxidized in the course of the further process to afford nitrogen dioxide ($NO_2$) (B, reaction scheme II) and finally reacted with water in an absorption apparatus to afford $HNO_3$ (C, reaction scheme III).

A) combustion of ammonia in an oxidation reactor for reaction of ammonia with oxygen to afford nitric oxide $$4NH_3 + 5O_2 \rightarrow 4NO + 6H_2O \tag{I}$$

The reaction heat of this exothermic step is about −226 kJ/mol NH3.

Thus in the nitric acid process this reaction step generates a heat of not more than 226 kJ/mol $HNO_3$ based on the end product.

Although the $O_2$ content of 21 vol % present in the combustion air is accordingly just enough to formally ensure complete conversion of 10 vol % of $NH_3$ into $HNO_3$, in the industrial production of $HNO_3$ the process gas is supplied with further oxygen, in particular atmospheric oxygen (secondary air), after the catalytic $NH_3$ oxidation and before entry into the absorption apparatus to accelerate the subsequent NO oxidation to afford $NO_2$ and thus the formation of $HNO_3$ in the absorption apparatus. The residual oxygen content of the offgas exiting the final absorption apparatus is typically about 1-5 vol %.

B) oxidation of nitrogen monoxide to afford nitrogen dioxide $$2NO + O_2 \rightarrow 2NO_2 \tag{II}$$

The reaction enthalpy of this exothermic step $\Delta Hr°$ is about 57.2 kJ/mol NO. However, in the nitric acid process this reaction step generates a heat of about 85 kJ/mol $HNO_3$ based on the end product since the absorption of $NO_2$ in water proceeds as a disproportionation with reformation of NO (cf. C) and NO requires reoxidation.

In the Ostwald nitric acid process this reaction proceeds as an uncatalyzed gas phase reaction.

C) formation of $HNO_3$ (nitric acid) by absorption of $NO_2$ in water in the condensers and the absorption tower with reformation of NO $$3NO_2 + H_2O \rightarrow 2HNO_3 + NO \tag{III}$$

The reaction heat of this exothermic step is about −58 kJ/mol $HNO_3$.

This results in the gross reaction:

$$NH_3 + 2O_2 \rightarrow HNO_3 + H_2O \tag{IV}$$

The process for producing nitric acid is a large industrial scale process. Processing sequences of such processes are subject to constant optimization to improve the energy efficiency of such processes and plants, to reduce their emissions of harmful gases, to enhance the yield of the process products and finally to reduce capital costs.

Thus a need exists for a process for producing nitric acid having the features recited at the outset and exhibiting enhanced energy efficiency, as well as a plant suitable for performing this process. A need also exists for the process and/or plant to be realizable with simple means and in particular allow upgrading of existing plants with simple means. Likewise, a need exists to bring about a reduction in required apparatus volumes, in particular for the absorption apparatuses.

DETAILED DESCRIPTION

Figure 1:
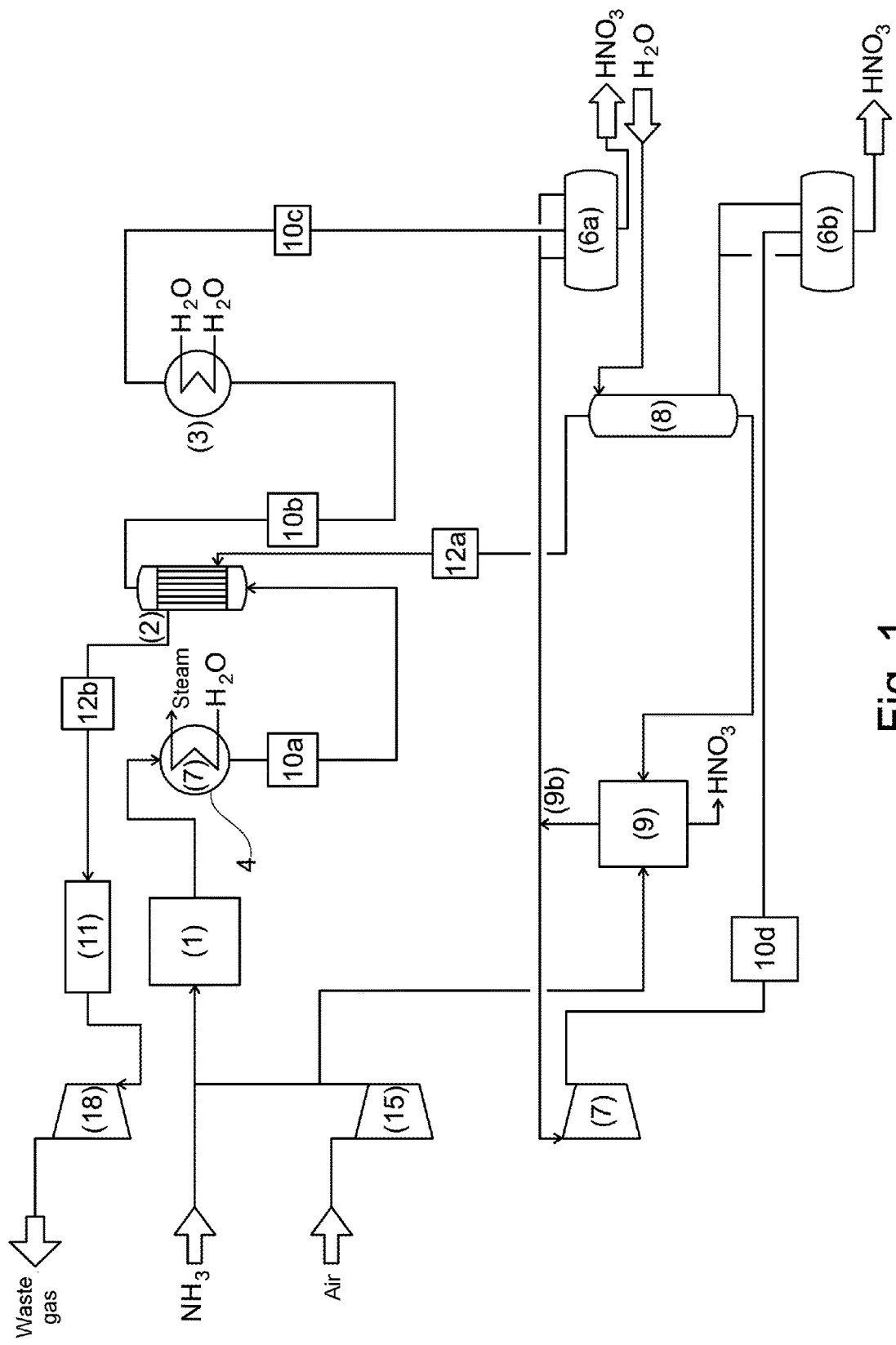
FIG. 1 is a diagrammatic view of a prior art nitric acid plant in a two-pressure process.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to processes for producing nitric acid by oxidation of ammonia with oxygen in the presence of catalysts to afford nitrogen monoxide-containing process gas in an oxidation reactor. In the course of some example processes, the nitrogen monoxide is oxidized to afford nitrogen dioxide that is reacted with water in an absorption apparatus to afford nitric acid, nitrous acid, and/or solutions of nitrates and/or nitrites. The present disclosure also generally relates to plants for producing nitric acid.

It has now been found that, surprisingly, the process for production of nitric acid can proceed with enhanced energy efficiency when at least one additional reactor is provided in which NO oxidation (reaction II) proceeds in a localized manner and as completely as possible.

The process according to the invention provides that the oxidation of the NO to afford $NO_2$ is effected in at least one additional reactor arranged between the oxidation reactor and an absorption apparatus and traversed by the NO-containing process gas and/or that the oxidation of the NO to afford $NO_2$ is effected in at least one additional reactor arranged in parallel with the absorption apparatus and connected to the absorption apparatus such that said reactor is traversed by NO-containing process gas; wherein the additional reactor is a container of any desired shape charged with a catalyst for the oxidation reaction of nitrogen monoxide to afford nitrogen dioxide.

In current nitric acid production processes (prior art) the reaction heat of reaction (I) from the combustion reaction is generated at a high caloric level and largely recovered and reused again in the gas cooling section of the process/of the plant.

The reaction heat from the absorption reaction (III) is generated at a very low caloric level and virtually entirely emitted into the cooling water.

Since the reaction rate is unusually proportional to $1/T^3$ and proceeds in a non-localized manner over the entire pipeline system, the reaction heat of the gas phase reaction (II) is likewise preferably evolved at a low caloric level. The design of the gas cooling section/of the energy recovery section of modern nitric acid plants does nevertheless allow utilization of about 50% of the total reaction heat of reaction (II) for steam generation or for recovery in the residual gas turbine. However, the remainder of the reaction heat is evolved in condensers/in the absorption apparatus and is emitted into the cooling water.

The additional reactor employed according to the invention in which the NO oxidation proceeds in a localized manner is integrated into the process such that the reaction proceeds at a high thermal level and the generated reaction heat can thus be efficiently recovered. More usable heat is therefore generated in the process.

In the additional reactor employed according to the invention typically at least 30 vol % of the NO present in the process gas is to be converted into $NO_2$, preferably at least 50 vol % and very particularly preferably at least 80 vol %.

It is preferable when the additional reactor in which the NO oxidation proceeds in a localized manner is arranged in the process/in the plant such that the entry temperature of the NO-containing process gas into the reactor in which the NO oxidation proceeds in a localized manner is 160-350° C., preferably 200-340° C., particularly preferably 220-320° C.

One possible preferred variant of the process provides that the additional reactor in which the NO oxidation proceeds in a localized manner is arranged downstream of the oxidation reactor for $NH_3$ combustion and upstream of a residual gas heater. The residual gas heater is to be understood as meaning a heat exchanger of any desired geometry in which the NOx-containing process gas is cooled and residual gas, which is supplied to a residual gas turbine for energy recovery, is heated.

An alternative preferred variant of the process provides that the additional reactor in which the NO oxidation proceeds in a localized manner is arranged downstream of the oxidation reactor for $NH_3$ combustion between an additional compression stage for compressing the process gas to the desired absorption pressure and a heat exchanger.

Another alternative preferred variant of the process provides that the additional reactor in which the NO oxidation proceeds in a localized manner is arranged downstream of the oxidation reactor for $NH_3$ combustion and upstream of an economizer. The economizer is to be understood as meaning a heat exchanger of any desired geometry in which the NOx-containing process gas is cooled and either water (usually for but not limited to the purpose of steam generation) is heated or else steam is generated directly.

Another alternative preferred variant of the process provides that the additional reactor in which the NO oxidation proceeds in a localized manner is arranged downstream of the oxidation reactor for $NH_3$ combustion and upstream of a heat exchanger which transfers the heat into a system providing a thermodynamic process for conversion of heat into mechanical energy. The application of such systems in nitric acid plants is described for example in DE 39 03 570 A1.

Another alternative preferred variant of the process provides that an additional reactor in which the NO oxidation proceeds in a localized manner is arranged in parallel with an apparatus in which the absorption of $NO_2$ in water proceeds and comprises integration points and feed points to this apparatus. The reactor in which the NO oxidation proceeds in a localized manner is thus fed via an intermediate takeoff. Further apparatuses, for example heat exchangers, may optionally be arranged between the reactor according to the invention and the absorption apparatus for purposes of thermal recovery.

An alternative further preferred variant of the process provides that the additional reactor in which the NO oxidation proceeds in a localized manner is arranged downstream of the oxidation reactor for $NH_3$ combustion between two apparatuses in which the absorption of $NO_2$ in water proceeds. Further apparatuses, for example heat exchangers, may optionally be arranged between the reactor according to the invention and the apparatuses for purposes of thermal recovery.

The additional reactor employed according to the invention in which the NO oxidation proceeds in a localized manner is a container of any shape whose total gas content is large enough to allow the reaction (II) to proceed largely completely as before as an uncatalyzed gas phase reaction. In the reactor employed according to the invention the reaction (II) proceeds in the presence of a catalyst, thus resulting in an acceleration compared to the uncatalyzed gas phase reaction.

The reactor employed according to the invention in which the NO oxidation proceeds in a localized manner may be realized by simple modification of existing plants. This is of particular advantage in the upgrading of existing plants since only insubstantial apparatus alterations, if any, are required. Often the pipelines for the NO-containing process gas are charged with a catalyst for the oxidation of NO to afford $NO_2$. This may be effected by coating the internal walls of these pipelines and/or by introducing dumped beds of shaped bodies containing the catalytically active component and/or consisting of the catalytically active component. In the process according to the invention the catalyst shaped body may be installed into the pipeline or into a reactor as a dumped bed or as an ordered packing, for example of honeycomb bodies.

The reactor employed according to the invention may likewise be in the form of a pipeline and connected to the absorption apparatus in parallel. Here too, the pipeline generally contains a heterogeneous oxidation catalyst as described hereinabove for the alternative process variants.

However, the additional reactors in which the NO oxidation proceeds in a localized manner may also be in the form of vessels/containers installed in pipelines for NO-containing gases and increasing the volume of these pipelines so that the oxidation reaction of NO to afford $NO_2$ proceeds primarily or entirely in these vessels. The interior of these vessels is preferably provided with heterogeneous oxidation catalyst as described above for the process variants with reactors in the form of pipelines.

It is particularly preferable to employ noble metal-containing or non-noble metal-containing heterogeneous oxidation catalysts. These NO oxidation catalysts are known per se and are employed for example as a standard component in the automotive industry. Catalysts suitable for the process according to the invention include in principle all catalysts containing as the active component at least one noble metal, metal or metal oxide which catalyzes the oxidation reaction of NO to afford $NO_2$.

The noble metals may be silver, gold or platinum-group metals. In the context of this description a platinum-group metal is to be understood as meaning an element of periods 5 and 6 of groups 8 to 10 of the periodic table, i.e. an element from the group of Ru, Rh, Pd, Os, Ir and Pt.

The non-noble metals may be for example iron, manganese, cobalt or nickel or their metal oxides or metal-doped aluminosilicates such as for example zeolites.

It is particularly preferable to employ oxidation catalysts that are also used predominantly in diesel engines to reduce harmful emissions. These are generally supported catalysts. Shaped bodies provided with noble metal-containing coatings are preferred. Production thereof may comprise depositing finely divided noble metal particles, in particular particles of the noble metals platinum and/or palladium, on oxidic coatings/support materials, for example aluminum oxide.

To impart a shape to such an active component it may be incorporated/embedded into any desired, preferably ceramic, matrix or else applied to any desired, preferably ceramic, support.

Ceramic support material based on oxides, carbides or nitrides of the elements selected from the group Si, Al, Mg, Zr and B is preferred and ceramic materials such as cordierite, mullite, magnesium oxide or very particularly silicon carbide which features high chemical and mechanical resistance and exceptional thermal conductivity are especially preferred.

Particularly preferred heterogeneous oxidation catalysts are honeycomb bodies coated with catalytically active materials (so-called monoliths). These coated honeycomb bodies may be integrated directly into the pipeline to form, together with the pipeline, the reactor employed according to the invention in which the NO oxidation proceeds in a localized manner.

Such catalysts may be produced by standard methods of catalyst production.

Likewise particularly suitable and preferred in the context of the invention is the use of unsupported catalysts, i.e. of shaped bodies consisting essentially of catalytically active material. Thus the catalyst shaped bodies should consist of catalytically active material to an extent of more than 70%, preferably to an extent of more than 80%, particularly preferably to an extent of more than 85%, based on the total weight of the shaped body.

The catalyst shaped body may be in the form of a shaped body of any desired size and geometry, preferably geometries which have a large ratio of surface area to volume and which generate the smallest possible pressure drop upon traversal. All geometries known in catalysis are typical, for example cylinders, hollow cylinders, multi-hole cylinders, rings, crushed granulate, trilobes or honeycomb structures. Honeycomb-shaped monoliths made of unsupported catalyst are particularly preferred. Also preferred are so-called miniliths, i.e. very small honeycomb-shaped bodies, which are generally used as a dumped bed material. The shaped bodies may be produced by shaping processes known in ceramic processing, for example dry pressing, granulation or extrusion.

The arrangement of the catalyst shaped bodies in the reactor employed according to the invention may be in the form of an irregular dumped bed or an ordered packing for example.

Particularly if an irregular dumped bed of unsupported catalysts is to be used, a preferred configuration of the reactor according to the invention is a radial reactor. Here, the catalyst/the catalysts is/are introduced into a concentric catalyst bed which is traversed by the process gas either from the inside outward or from the outside inward.

Figure 2:
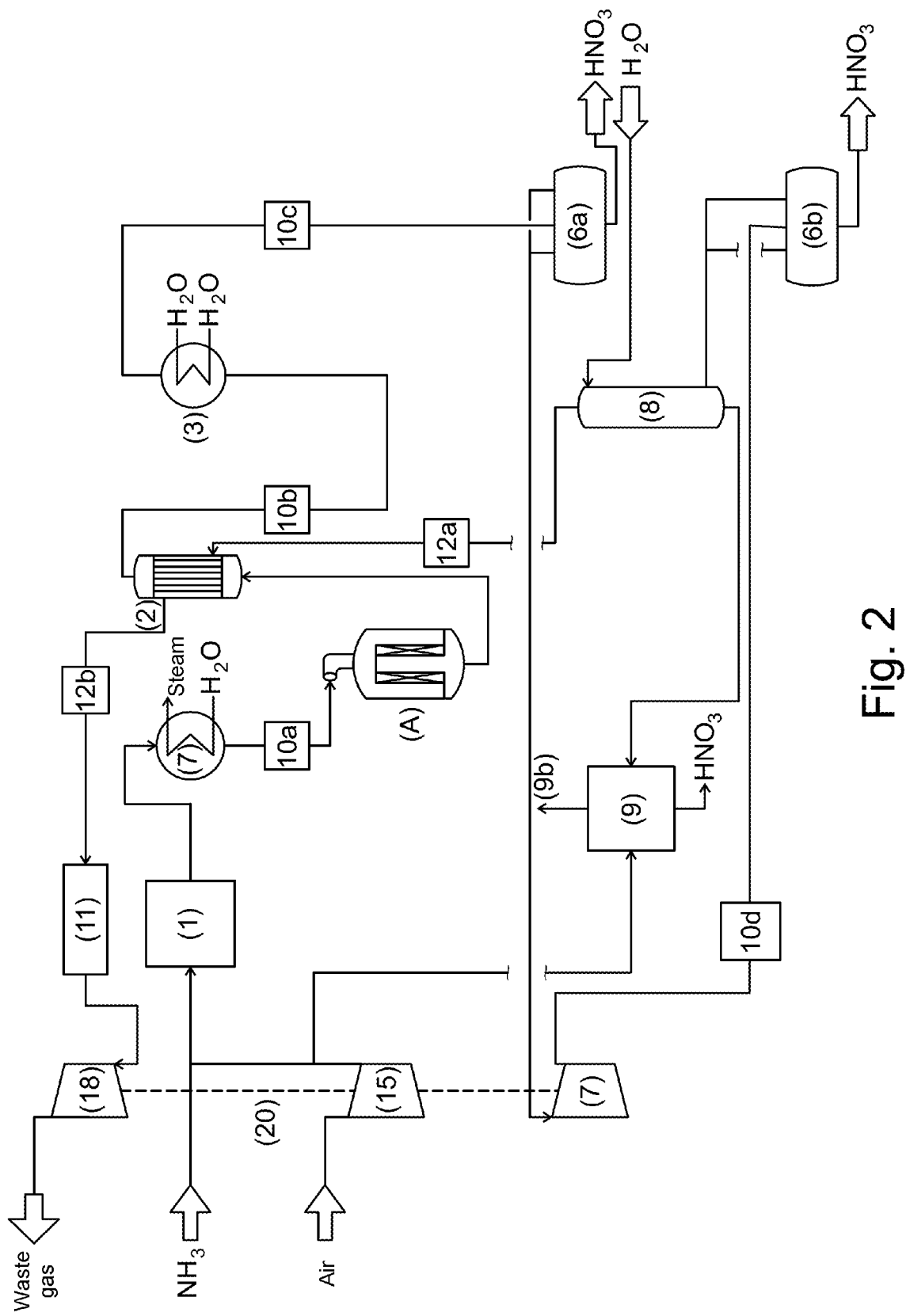
FIG. 2 is a diagrammatic view of an example nitric acid plant, by way of example in a two-pressure process.

A process simulation shows that the proportion of reusable heat resulting from reaction (II) may be increased from 50-55% to about 70-75% simply by providing a reactor A (cf. FIG. 2). This corresponds to an energy of about 3-4 MW in a nitric acid plant having a capacity of 1000 TPD. This proportion can be increased further by providing further reactors.

In addition to the above-referenced energy recovery from the quantitative performance of reaction (II) at a higher caloric level, the inventive use of the reactors in which the NO oxidation proceeds in a localized manner also brings further advantages:

- the first and second coolers and condensers may be operated more efficiently, thus relieving the absorption apparatus and optionally allowing said apparatus to be made smaller;
- in a two-pressure plant the volume flow from the first cooler and condenser to the NO compressor may be reduced due to a low temperature increase in the pipeline to the NO compressor;
- the volume flows in the plant are lower due to the volume reduction associated with reaction (II); this results in lower pressure drops in the pipelines;
- design certainty for heat exchangers is altogether increased, in particular for the heat exchanger/residual gas heater and thus the offgas aftertreatment due to the defined position of the $NO/NO_2$ equilibrium;
- specifications for necessary pipeline volumes (for sufficient oxidation (II)) no longer apply; this results in new potential for optimizing apparatus setup and in lower pipeline weights and altogether reduced space requirements for the plant;
- cooling water consumption can be reduced;
- enhanced safety in respect of the risk of an ammonia breakthrough in the $NH_3$ oxidation reactor can be achieved since the catalysts employed according to the invention often also exhibit an activity for the oxidation of ammonia to afford nitrogen.

The present invention further provides a plant for producing nitric acid comprising at least the following elements:

A) at least one oxidation reactor for ammonia oxidation fitted with at least one feed conduit for an ammonia- and oxygen-containing reactant gas mixture and with at least one discharge conduit for a nitrogen monoxide (NO)-containing process gas, B) a catalyst for the oxidation of ammonia with oxygen in the interior of the oxidation reactor, C) at least one absorption apparatus for absorption of nitrogen dioxide ($NO_2$) and formation of nitric acid ($HNO_3$), nitrous acid ($HNO_2$) or solutions of nitrates and/or nitrites, and D) at least one additional reactor for oxidation of NO to afford $NO_2$ arranged between the oxidation reactor and the absorption apparatus or downstream of the absorption apparatus and traversed by the NO-containing process gas and/or at least one additional reactor for oxidation of NO to afford $NO_2$ arranged in parallel with the absorption apparatus and connected to the absorption apparatus such that said reactor is traversed by NO-containing process gas; wherein in the additional reactor the oxidation reaction of nitrogen monoxide to afford nitrogen dioxide is effected over a catalyst.

In a preferred development of the invention the plant further comprises at least one residual gas heater having a heat exchanger function which is operatively interconnected with the absorption apparatus and which is traversed by a residual gas stream exiting the absorption apparatus, wherein the additional reactor is arranged between the oxidation reactor and a residual gas heater.

In a preferred development of the invention the plant further comprises at least one residual gas heater having a heat exchanger function which is operatively interconnected with the absorption apparatus, and which is traversed by a residual gas stream exiting the absorption apparatus, and the plant further comprises an additional compression stage for compressing the process gas to the desired absorption pressure, wherein the additional reactor is arranged between the compression stage and a residual gas heater.

In a preferred development of the invention the plant further comprises at least one residual gas heater having a heat exchanger function which is operatively interconnected with the absorption apparatus, and which is traversed by a residual gas stream exiting the absorption apparatus, and the plant further comprises at least one economizer traversed by the process gas stream, wherein the additional reactor is arranged between a residual gas heater and the economizer.

In a preferred development of the invention the plant comprises at least two additional reactors for oxidation of NO to afford $NO_2$, of which at least one is arranged between the oxidation reactor and a residual gas heater and of which at least one is arranged between an additional compression stage for compressing the process gas to the desired absorption pressure and a further residual gas heater.

In a preferred development of the invention the plant comprises at least two additional reactors for oxidation of NO to afford $NO_2$, of which at least one is arranged between the oxidation reactor and a residual gas heater and of which at least one is arranged between a residual gas heater and at least one economizer traversed by the process gas stream.

In a preferred development of the invention the plant comprises at least two additional reactors for oxidation of NO to afford $NO_2$, of which at least one first reactor is arranged between the oxidation reactor and an absorption apparatus in the flow direction of the process gas and of which at least one further reactor is arranged either in parallel with an absorption apparatus in the flow direction or downstream of an absorption apparatus in the flow direction or between two absorption apparatuses in which the absorption of $NO_2$ in water proceeds.

In a preferred development of the invention the plant comprises at least one additional reactor arranged in parallel with the absorption apparatus and connected to the upper third and the middle or the lower third of the absorption apparatus.

FIG. 1 shows a simplified process flow diagram of a typical conventional two-pressure plant for producing nitric acid. The plant comprises an $NH_3$ oxidation reactor 1 in which the oxidation of the ammonia to afford nitric oxide (NO) proceeds according to the reaction scheme (I) hereinabove. This $NH_3$ oxidation reactor 1 is supplied via a compressor 15 with combustion air. Gaseous ammonia is mixed with the combustion air and this mixed gas is then supplied to the $NH_3$ oxidation reactor 1. Said reactor usually has a steam generator 4 connected directly downstream of it for recovery of the high-caloric-level combustion heat. The NO gas produced by the reaction in the $NH_3$ oxidation reactor 1 then flows to a residual gas heater 2 and then through an economizer 3 (which has a heat exchanger function). In the cooler/condenser 6a the process gas is then supercooled, i.e. cooled to below its dew point. This results in partial condensation of the water proportion present in the process gas and in a proportion of acid formation by absorption (reaction III, cooler/condenser already operates as an absorption apparatus). Since the example concerns a two-pressure plant it includes a subsequent additional compression stage 7 performing a compression to the desired absorption pressure. The NO gas then optionally traverses further heat exchangers 10d and a further cooler and condenser 6b and then arrives in a (main) absorption apparatus 8 in which the nitric acid product is formed by absorption of $NO_2$ in water according to the above reaction scheme (III and II).

There is generally no limitation on the number and sequence of the heat exchangers used for cooling the process gas above the dew point (residual gas heater, economizer, heat exchanger with other cooling media). The number and sequence is determined by manufacturing, construction or infrastructural technical factors and design requirements. Further residual gas heaters, economizers or heat exchangers with other cooling media may occupy each of positions 10a, 10b, 10c, 10d.

The residual gas exits the absorption apparatus 8 in the top region thereof and is heated in the residual gas heater 2 to then arrive into a residual gas reactor 11 in which residual $NO_x$ and optionally $N_2O$ are removed generally by catalytic means. The residual gas finally traverses a residual gas turbine 18 for energy recovery during decompression of the residual gas into the atmosphere.

There is generally no limitation on the number and sequence of the heat exchangers used for heating the residual gas (residual gas heater, heat exchanger with other heating media). The number and sequence are determined by manufacturing, construction or infrastructural technical factors and design requirements. Further residual gas heaters or heat exchangers with other heating media may occupy each of positions 12a, 12b.

The plant further comprises a functional unit 9 for workup of the product acid produced in the absorption apparatus 8 using the secondary air stream. This secondary air stream is a substream diverted upstream of the reactor 1 from the combustion air produced by the air compressor 15. After exiting the functional unit 10 this secondary air stream may be supplied to the process gas stream via conduit 9b, for example downstream of the cooler and condenser 4. This increases the oxygen content of the process gas.

FIG. 2 shows a simplified process flow diagram of a two-pressure plant for producing nitric acid which has been modified according to the invention. According to the invention the plant comprises not only the above-described elements 1 to 18 but also the additional reactor A in which the NO present in the gas stream is oxidized to afford $NO_2$ as completely as possible. In FIG. 2 this is the exemplary additional reactor A, a catalyst being present as an irregular dumped bed in a radial reactor. The concentric catalyst bed (irregular dumped bed) is traversed from the inside outward in this example. It is generally also possible according to the invention for a plurality of inventive reactors A to be provided. The additional reactor A is traversed by the NO-containing process gas. The oxidation reaction proceeding in these additional reactors evolves additional heat which effects further heating of the process gas. The residual gas can thus be subjected to stronger heating in the downstream residual gas heater 2. This necessarily results in a particularly efficient recuperation of the additionally generated usable heat by decompression in the residual gas turbine 18. This energy may then be used directly for propulsion of the compressors 15, 7 for example, as indicated in FIG. 2 by the dashed shaft 20.

Figure 3:
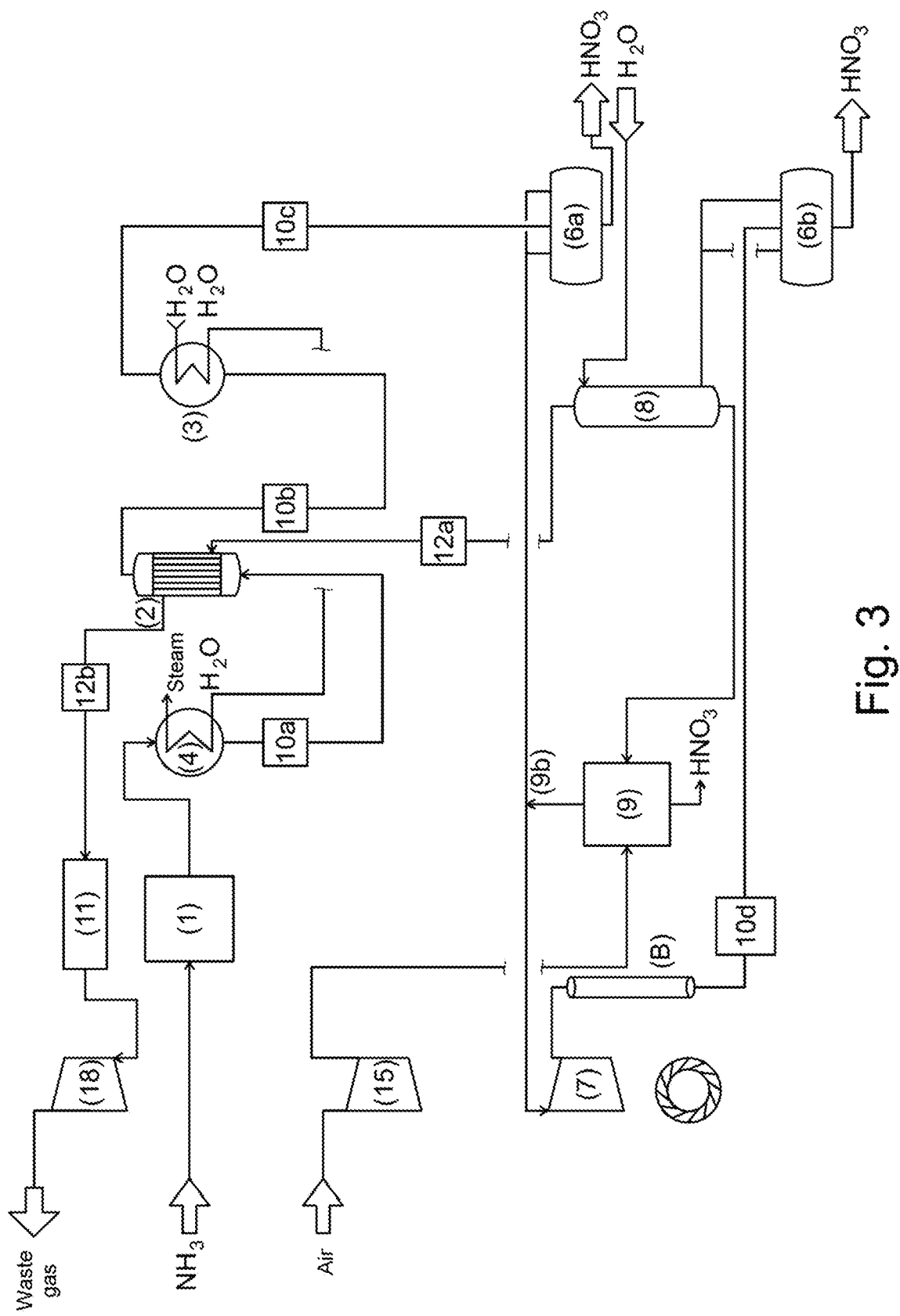
FIG. 3 is a diagrammatic view of another example nitric acid plant, by way of example in a two-pressure process.

FIG. 3 shows a simplified process flow diagram of a two-pressure plant for producing nitric acid which has been modified according to the invention. According to the invention the plant comprises not only the above-described elements 1 to 18 but also the additional reactor B in which the NO present in the gas stream is oxidized to afford $NO_2$ as completely as possible. In FIG. 3 this is the exemplary additional reactor B, a catalyst being present as a coating in the pipeline system or in a suitable container. It is generally also possible according to the invention for a plurality of inventive reactors B of this type to be provided. The additional reactor B is traversed by the NO-containing process gas. The oxidation reaction proceeding in this additional reactor evolves additional heat which effects further heating of the process gas. This allows more heat to be recovered in a downstream heat exchanger 10d of any desired type. In modern two-pressure plants a temperature preferred for the oxidation of NO to $NO_2$ may be obtained directly by compression in the second compression stage and the compression heat associated therewith.

Figure 4:
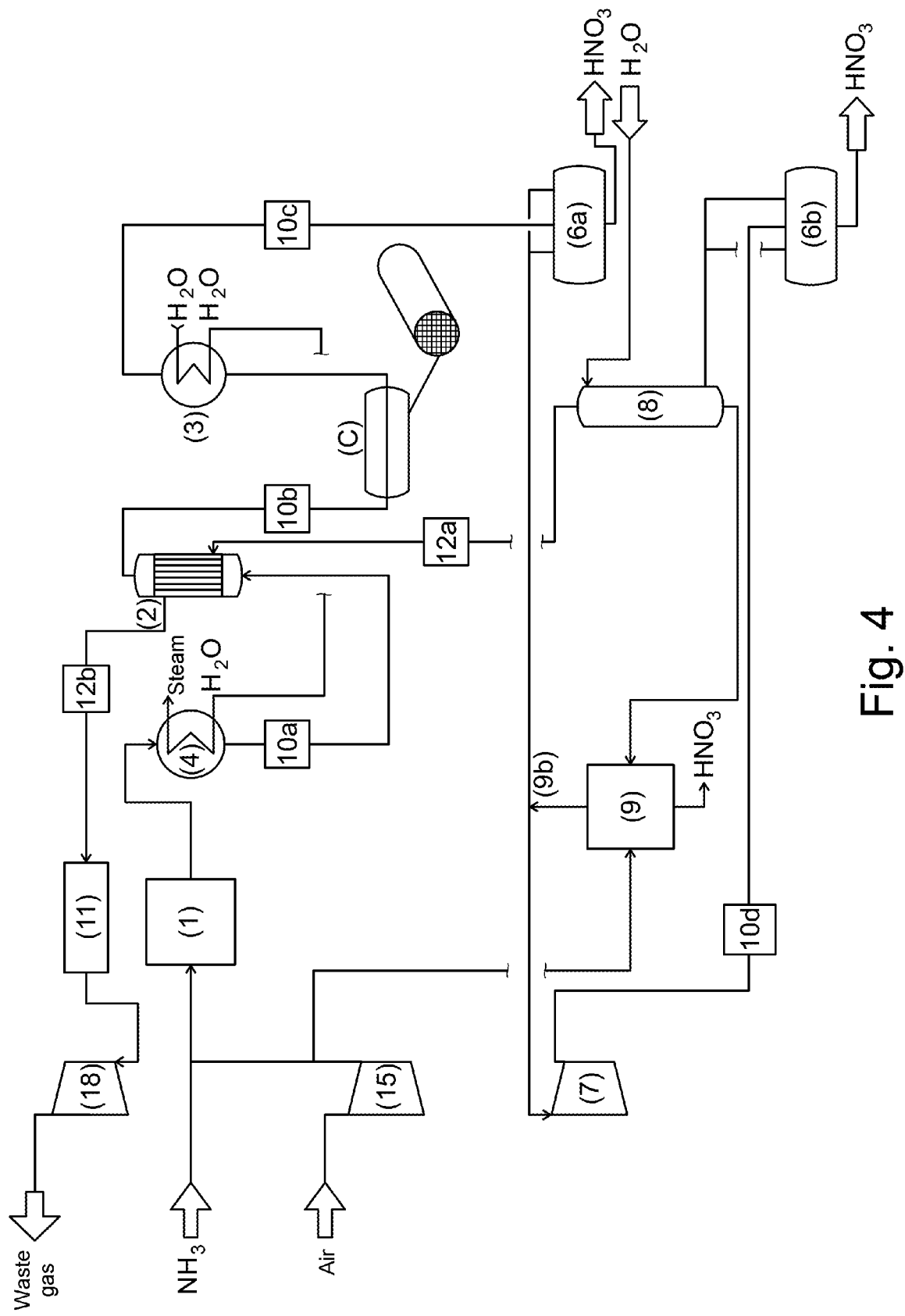
FIG. 4 is a diagrammatic view of still another example nitric acid plant, by way of example in a two-pressure process.

FIG. 4 shows a simplified process flow diagram of a further two-pressure plant for producing nitric acid which has been modified according to the invention. According to the invention the plant comprises not only the above-described elements 1 to 18 but also the additional reactor C in which the NO present in the gas stream is oxidized to afford $NO_2$ as completely as possible. In FIG. 4 this is the exemplary additional reactor C, a catalyst as a structured packing in the form of honeycomb bodies being integrated into the pipeline system or being present as such in a suitable reactor container. It is generally also possible according to the invention for a plurality of inventive reactors C of this type to be provided. The additional reactor C is traversed by the NO-containing process gas. The oxidation reaction proceeding in these additional reactors evolves additional heat which effects further heating of the process gas. Water can thus be subjected to stronger heating in the downstream economizer 3. This additionally generated usable heat can be utilized internally and without substantial additional infrastructure for steam generation in the steam generator 4 as indicated in the drawing. Generated steam may be used for example for machine propulsion via a steam turbine, for electricity generation or, similarly to water in the case of using the economizer 3 for hot water generation, for heating purposes for example.

Figure 5:
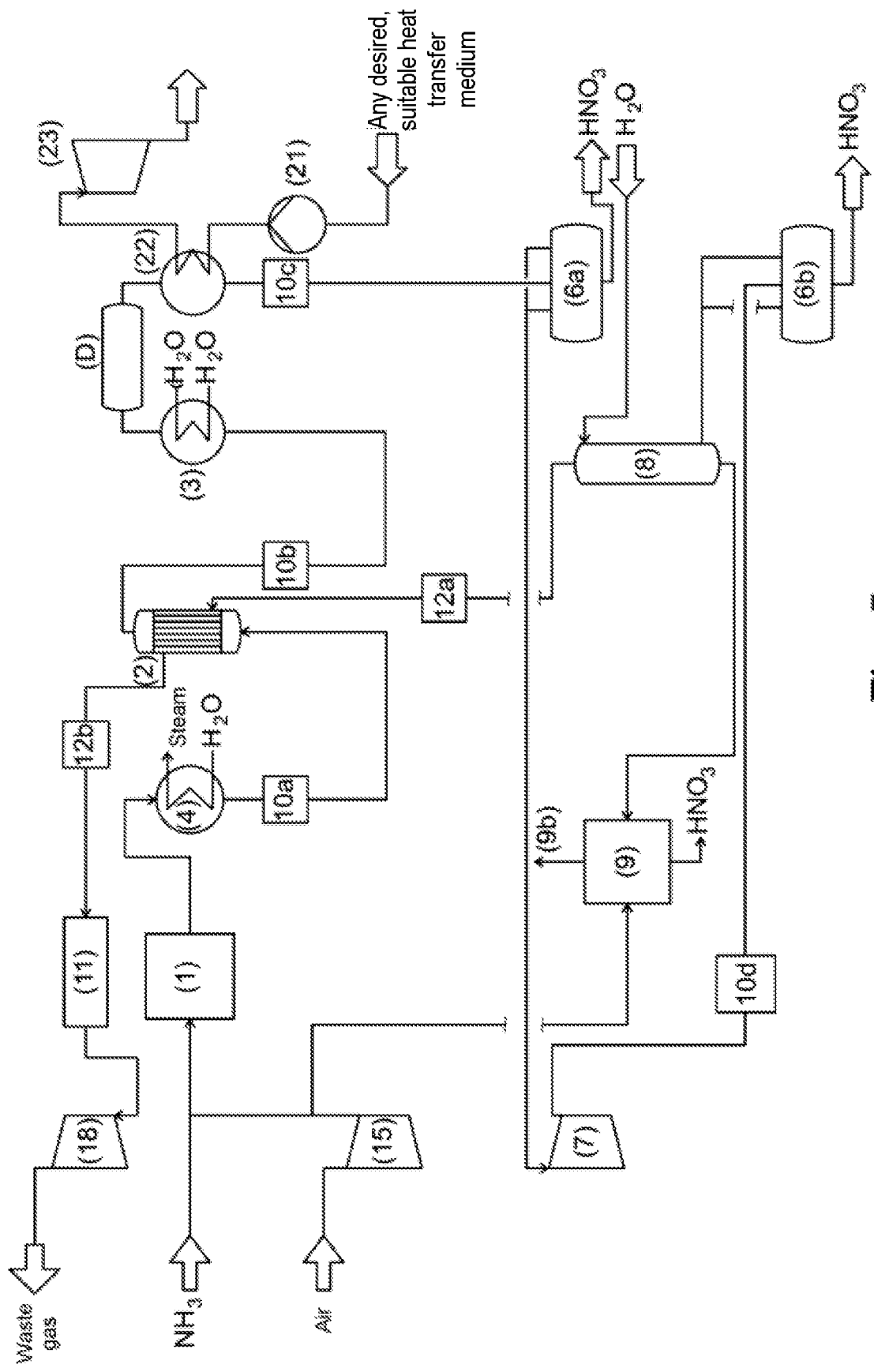
FIG. 5 is diagrammatic view of yet another example nitric acid plant, by way of example in a two-pressure process.

FIG. 5 shows a simplified process flow diagram of a further two-pressure plant for producing nitric acid which has been modified according to the invention. According to the invention the plant comprises not only the above-described elements 1 to 18 but also the additional reactor D in which the NO present in the gas stream is oxidized to afford $NO_2$ as completely as possible. It is generally also possible according to the invention for a plurality of inventive reactors D of this type to be provided. The additional reactor D is traversed by the NO-containing process gas. The oxidation reaction proceeding in these additional reactors evolves additional heat which effects further heating of the process gas. This allows any desired suitable heat transfer medium to be subjected to stronger heating in the downstream heat exchanger 22. This additionally generated usable heat may, as indicated in the drawing, be recovered in the indicated system for conversion of heat into mechanical energy. Such external systems, here represented generally through compression 21 and decompression 22 of the heat transfer medium, allow particularly flexible utilization of the additional usable heat generated according to the invention for generation of mechanical energy.

Figure 6:
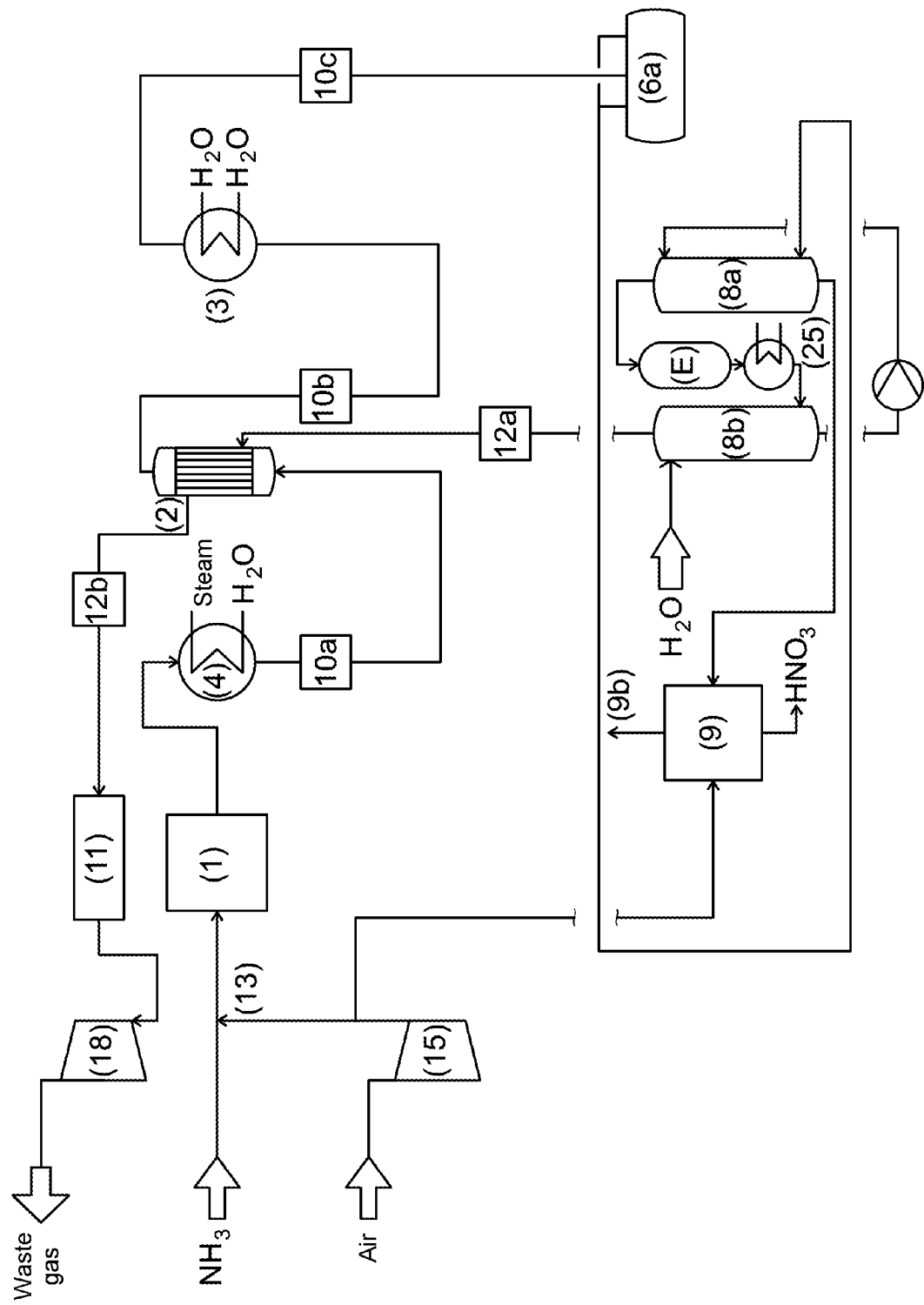
FIG. 6 is a diagrammatic view of an example nitric acid plant, by way of example in a monopressure process.

FIG. 6 shows a simplified process flow diagram of a further monopressure plant for producing nitric acid which has been modified according to the invention. The (main) absorption apparatus 8 in which $NO_2$ is absorbed in water to afford nitric acid according to reaction 3 (in countercurrent here) is divided into two apparatuses 8a, 8b in this exemplary embodiment. According to the invention the plant comprises not only the above-described elements 1 to 18 but also the additional reactor E in which the NO present in the gas stream is oxidized to afford $NO_2$ as completely as possible. It is generally also possible according to the invention for a plurality of inventive reactors E of this type to be provided. The additional reactor E is traversed by NO-containing process gas. The oxidation reaction proceeding in these additional reactors evolves additional heat which may be recovered in the downstream heat exchanger 25 of any desired type. The arrangement between the two (main) absorption apparatuses 8a and 8b reduces the required total volume for absorption in the apparatuses 8a, 8b.

Similar alternative variants of this invention both in the monopressure and in the two-pressure process are the arrangement of the additional reactor (E) in parallel with only one absorption apparatus 8 by means of an intermediate takeoff or else the arrangement of the additional reactor E between cooler/condenser 6 and absorption apparatus 8.

LIST OF REFERENCE NUMERALS

1 $NH_3$ oxidation reactor
2 residual gas heater
3 economizer
4 steam generator
6a cooler/condenser
6b cooler/condenser
7 compression stage/compressor
8 absorption apparatus
8a absorption apparatus
8b absorption apparatus
9 functional unit
9b conduit
10 residual gas reactor
10a further residual gas heater, economizer or heat exchanger
10b further residual gas heater, economizer or heat exchanger
10c further residual gas heater, economizer or heat exchanger
10d further residual gas heater, economizer or heat exchanger
11 residual gas reactor
12a further residual gas heater or heat exchanger
12b further residual gas heater or heat exchanger
15 air compressor/compressor
18 residual gas turbine
20 shaft
21 compression
22 decompression/downstream heat exchanger
25 downstream heat exchanger
A additional reactor
B additional reactor
C additional reactor
D additional reactor
E additional reactor

What is claimed is:

1. A process for producing nitric acid comprising:
oxidizing ammonia with oxygen in a presence of catalysts to provide a process gas containing nitrogen monoxide in an oxidation reactor;
supplying oxygen-containing gas to the nitrogen monoxide;
oxidizing the nitrogen monoxide in a second reactor to provide nitrogen dioxide that is reacted with water in an absorption apparatus to provide nitric acid, nitrous acid, and/or solutions of nitrates and/or nitrites, wherein the second reactor is a container charged with a catalyst for oxidizing the nitrogen monoxide to provide the nitrogen dioxide, wherein the second reactor is at least one of:
 positioned between the oxidation reactor and the absorption apparatus with respect to a flow direction of the process gas such that the process gas traverses the second reactor, or
 positioned in parallel with the absorption apparatus and connected to the absorption apparatus such that the process gas traverses the second reactor; and
causing the process gas to enter the second reactor at a temperature of 160° C.-350° C.

2. The process of claim 1 wherein the second reactor is positioned downstream of the oxidation reactor and upstream of a residual gas heater with respect to the flow direction of the process gas.

3. The process of claim 1 wherein the second reactor is a container whose total gas content is large enough for the oxidation of the nitrogen monoxide to provide the nitrogen dioxide as a gas-phase reaction to proceed completely.

4. The process of claim 1 wherein the second reactor is a radial bed reactor comprising a concentric catalyst bed that is traversed by the process gas.

* * * * *